United States Patent Office 3,377,171
Patented Apr. 9, 1968

3,377,171
DUSTING STARCH AND METHOD
USING THE SAME
William J. Ryan, Bronx, N.Y., and Lawrence Kogan, Stamford, Conn., assignors to Standard Brands Incorporated, New York, N.Y., a corporation of Delaware
No Drawing. Continuation-in-part of application Ser. No. 480,802, Aug. 18, 1965. This application Apr. 21, 1966, Ser. No. 544,067
9 Claims. (Cl. 99—90)

This application is a continuation-in-part of our application Ser. No. 480,802, filed Aug. 18, 1965 (now abandoned), which was a continuation-in-part of our application Ser. No. 118,535 filed June 21, 1961 (now abandoned).

This invention relates to new free-flowing starches and new free-flowing modified starches designed especially for use as dusting powders, particularly for dusting dough pieces in the bakery. More particularly, it relates to free-flowing starches and free-flowing modified starches which have been coated with certain metal salts or other mobility increasing agents and also with oils or fats or other mobility decreasing agents. The invention also relates to processes for producing such products and their use as dusting agents.

In the process of this invention any of the common cereal or root starches may be utilized, for example corn, sorghum, wheat, rice, tapioca and potato starch, as well as modified starches, which term is meant to include any of the common cereal and root starches which have undergone chemical or physical modification, other than a change in their ungelatinized granular form. Such modification may result in alteration of their physical properties after pasting and includes, for example, dextrinization, oxidation, esterification and acid modification. The term starch is used hereinafter to include all such starches and modified starches.

Flour is commonly used as a dusting powder in the baking industry. Efforts have been made to use powdered starch for dusting in bakeries, because it possesses the advantage over flour that it will not support insect life, but the results obtained have not been entirely satisfactory. One reason for this is the fact that ordinary dried and powdered starches are not sufficiently mobile or free-flowing and consequently they have a tendency toward bridging. Moreover, they flow too quickly through the screens of the mechanical dusting equipment commonly used in bakeries with flour and are too dusty, i.e., they generate a great deal of dust in the air surrounding the dusting equipment.

Two methods were employed in this invention to determine the mobility and flow rate of the product. One is the Kerr Mobility test. Kerr Mobility is determined by taking 200 grams of the starch being tested, placing it on a No. 200 U.S. standard mesh sieve and shaking the sieve on a Ro-Tap shaker for 30 seconds. The percentage by weight of starch passing through the sieve is taken as an index of its mobility. Common powdered starches normally have Kerr Mobilities of the order of about 30 to 70%. Occasionally, starches are found which have Kerr Mobilities below this range. Wheat flour normally has a Kerr Mobility in the range of 65 to 85%. Kerr Mobility ratio of a treated starch is the ratio of its Kerr Mobility to the Kerr Mobility of untreated starch.

Flow rates were also determined in some cases on a Day dusting machine which is one of several machines commonly used in bakeries today for dusting dough with flour. The particular machine used in the tests was 16 inches long and was equipped with a shaker arm whose speed was constant at 287 strokes per minute. In these tests, unless otherwise indicated, the Divider screen was used. This screen has 100 holes, approximately 0.0670 inch in diameter, per square inch.

It is known that powdered starches can be rendered mobile by treatment or coating with a variety of metal salts and other compounds in a finely divided state. These compounds are either added to, or formed in situ in, a water slurry of the starch prior to filtering, drying and pulverizing, or they are dry blended with the starch before or after pulverizing. Such processes are described, for instance, in Canadian Patent No. 526,173, which employs tricalcium phosphate, calcium pyrophosphate, calcium phytate, and magnesium phosphate and in U.S. Patent No. 2,614,945 which employs a large group of water-insoluble salts and hydroxides.

The mobile starches produced in this manner have a flow rate which is higher than that of common powdered starches and they are substantially devoid of the tendency to cake or bridge. They have a Kerr Mobility ratio greatly in excess of 1.0. According to the Canadian patent, column 5, the Kerr Mobility ratio of such mobile starches varies between 1.6 and 9.3 depending upon the amount and character of the salt added to the starch. These mobile starches are designed for use in pneumatic dusting equipment where high flow rates are required. Such starches suffer, however, from the disadvantage that they generate too much dust. For this reason they have not found wide use in bakeries. Moreover, their flow rate is too high for use in mechanical dusting equipment of the type commonly employed in bakeries for dusting with flour.

An object of the invention is to provide a free-flowing starch which is substantially free of any tendency toward caking or bridging and has little tendency to generate dust in the air when used in mechanical dusting equipment. Another object of the invention is to provide a product having these characteristics and in addition a flow rate which is a great deal lower than that of common powdered starch. A further object of the invention is to provide a dusting starch having the aforementioned characteristics which can be used advantageously in the mechanical dusting equipment commonly found in bakeries today.

In accordance with the invention, starch is treated or coated with both a small amount of a metal salt or other chemical compound capable of increasing its mobility substantially and a small amount of an oil or fat or equivalent agent effective to reduce the flow rate of the product. The product obtained offers advantages over dusting flour in that it generates much less dust, will not support insect life and less of its is required for effective dusting. The result obtained is surprising in view of the fact that the coating of starch with the oil or fat alone results in a product which tends to bridge and has a flow rate which is erratic and usually too low for satisfactory use as a dusting powder. The product of this invention is actually less mobile than common powdered starch in terms of its Kerr Mobility or its flow rate. Yet surprisingly it possesses the non-bridging characteristic commonly associated with highly mobile starches. Though Kerr Mobility and Day Duster flow rate do not correlate well numerically, they do vary in the same direction and are manifestations of one and the same property as evidenced by the fact that either can be used to evaluate the product for dusting purposes.

In the present invention any of the compounds disclosed in the aforementioned Canadian and U.S. patents or equivalent compounds may be used to increase the mobility of the starch. Tricalcium phosphate is preferred. To reduce the flow rate we may use, for example, mineral oils, any of the glyceridic oils and fats, for example the vegetable and animal oils and fats, silicon oils, triethyl citrate and paraffin wax. Of the higher melting fats, it is preferable to use one which is liquid at the ambient temperature in the bakery or other area where the starch is to be used. In bakeries the ambient temperature is usually about 70–100° F. The vegetable oils are economical and convenient to use. Suitable vegetable oils are, for example, corn soybean, cottonseed, olive and peanut oils. Oils having a low tendency to oxidize such as olive oil are preferred since starch coated therewith has much less tendency to lose on storage the desirable properties imparted to it by the process of the invention. The more oxidizable oils may also be employed but in this case it is desirable to increase the shelf life of the coated starch by incorporating an antioxidant in the oil.

The starch may be treated or coated first with one of the agents employed in this invention and then with the other or with both simultaneously. When these agents are applied separately, it makes no appreciable difference which is applied first. The agents may be dry-blended separately or simultaneously with powdered starch or they may be applied separately or simultaneously with a slurry of the starch in water or another suitable liquid medium. When an oil or fat was incorporated in a water slurry of starch, it was found that, unexpectedly, practically all of the oil and fat was absorbed by the starch in the slurry and remained with the starch during filtration, drying and pulverizing.

The metal salts should be employed in an amount effective to substantially increase the mobility of powdered starch. Very small amounts, usually less than about 1.0% are sufficient for this purpose. Greater amounts may be added if desired, although usually a relatively small further increase in mobility is imparted by increasing the amount substantially beyond about 1.25%. Of course, the amount required to impart a given mobility will vary depending upon the salt used. In the case of tricalcium phosphate satisfactory results can be obtained, for instance, with amounts varying from about 0.1% to about 1.0%. About 0.4% to 0.8% is preferred.

Commercial starches normally contain a small amount of fatty materials. Some of this material is extractable with an organic solvent like carbon tetrachloride and would appear therefore to be on the surface of the starch granules. The rest of the fatty material is extractable if the starch is first hydrolyzed. Corn starch, for instance, may normally contain fatty material extractable with carbon tetrachloride in amounts varying from traces to as much as about 0.12%. Such fatty material should be taken into account in determining the amount of oil or fat or equivalent mobility reducing material to be added in the process of our invention.

The amount of mobility reducing material required in our invention to obtain the desired result will also vary, depending upon the nature of the mobility reducing material and the thoroughness and uniformity with which it is incorporated in the product and the amount and kind of metal salt or equivalent agent added to the starch. In case an oil or fat is used the total amount thereof in the starch extractable with $CCl_4$ should not exceed about 0.5%, if the oil or fat is thoroughly distributed over the starch powder, but may be as high as about 1.0% if it is not thoroughly distributed. Higher amounts may not give a product with the most desirable flow characteristics. The total extractable oil and fat will consist of extractable fatty material already present on the granular starch starting material and that absorbed by the starch granules in the coating process of this invention. In the case of corn oil and olive oil the total extractable oil and fat should preferably amount to about 0.15% to 0.30% and advantageously about 0.22%.

It is essential that the relative amounts of the two coating agents employed be chosen to give a coated starch product having a Kerr Mobility ratio between about 0.02 and less than 1.0 and thus make the starch suitable for use in mechanical dusting machines of the type of the Day Duster.

Both the salt or other agent used to increase mobility and the oil or fat or equivalent agent must be thoroughly and uniformly spread throughout the mass of powdered starch to coat the starch granules. This can be accomplished by dry blending the mixture thoroughly by passing it repeatedly through fine sieves or in mechanical mixers, for instance ball mills and comminuting machines such as a Mikropulverizer. Both agents may also be dispersed in a slurry of the starch in water or other suitable liquid medium, the slurry agitated for a few minutes or longer and then filtered. The coated starch is dried and pulverized in the ordinary manner. If desired, a solvent for the oil or fat, or equivalent agent, for instance methylene chloride, may be used to form the slurry. In this case, an oil or fat, for instance, is dissolved in a quantity of the solvent, the starch and salt are slurried in this solution and the solvent is evaporated from the slurry to obtain a dry starch product coated with both the salt and the oil or fat.

When an oil or fat is dispersed in a slurry of the starch in water, absorption of the oil or fat occurs quickly, usually within the first few minutes of agitation. The speed of absorption will depend upon the size of the equipment used and the violence of the agitation. Essentially all of the oil added to the slurry is retained by the starch. In the specific examples given below, the agitation period was one hour. This length of time is not critical and was chosen only to assure maximum distribution of the additives.

The concentration of starch in the slurry employed in the process of this invention is not critical and may vary greatly. Also, the temperature of the slurry may vary widely so long as it is held below about 130° F. to avoid pasting the starch.

It has been found that the flow rate of the dried and pulverized coated products obtained by the process of this invention employing an oil or fat in an aqueous slurry, can be reduced by subjecting the products to mechanical blending, for instance in a Ribbon blender. The degree to which the flow rate is reduced depends upon the duration of the blending. The reduction reaches a maximum after which further blending does not bring about any further reduction. The reason for this effect is not known. However, it is probable that blending brings about a more intimate and even distribution of the oil or fat over the starch granules. Advantage may be taken of this effect to control the flow rate of the product and thus obtain products having a uniform flow rate. In this respect the products of the invention offer important advantages over flour for dusting because the flow rate of flour varies greatly depending upon its geographical source and its use in the bakery frequently necessitates considerable adjustment in the dusting equipment.

The mobile starches containing 0.5% tricalcium phosphate, used as a starting or comparison material in some examples, was prepared by blending 6,000 pounds of food grade powdered corn starch with 30 pounds of tricalcium phosphate for one hour in a Ribbon blender. A typical analysis of the corn starch indicated that it contained about 10% moisture, that 98.0% or more of the particles passed through a No. 200 U.S. standard sieve, and that 1,750 grams passed through the Divider screen of the Day dusting machine in 3 minutes. 98.2% of the tricalcium phosphate consisted of particles which passed through a No. 325 U.S. standard sieve. The following is a typical analysis of the mobile starch product obtained:

| | |
|---|---|
| Moisture ____________ percent__ | about 10 |
| Kerr Mobility ____________ do____ | about 99.2 |
| Through No. 325 U.S. standard sieve _do____ | 98.0 |
| Through Day Duster Divider screen (in 1.5 minutes) ____________ grams__ | 1595 |

The invention is illustrated by the following specific examples. In these examples and throughout the specification, all percentages are by weight and, unless otherwise stated, are based on the dry substance weight of the starch. Unless otherwise stated, the Day Duster tests were carried out with the Divider screen. The final products in all of the examples had a Kerr Mobility ratio less than 1.0.

EXAMPLE 1

One hundred grams of mobile starch made by coating corn starch with 0.5% food grade tricalcium phosphate was mixed with three liter corn oil by aeration with a sparger. The mixture was filtered to reduce the percentage of oil to 11% based on the weight of the mixture. This pony was combined with more of the mobile starch used as the starting material. The mixture was placed in a can, was tumbled therein by hand and then forced by hand through a No. 80 mesh sieve several times. This procedure was repeated several times with added amounts of the mobile starch starting material until the oil level in the final mixture was 0.15%. The product was evaluated on the Day dusting machine using both the Molder and Divider screens and its flow rate was found to be much lower than the flow rate through the same screens of common corn starch which had been ground so that 98+% of the particle passed through a No. 200 U.S. standard sieve.

EXAMPLE 2

One hundred thirty grams of a mobile starch made by coating corn starch with 0.5% tricalcium phosphate, was slurried with 500 ml. of corn oil by vigorous stirring in a Waring Blendor for 35 minutes. The slurry was filtered to reduce the percentage of oil to 15.5% on the weight of the product. The resulting pony was mixed with increments of the mobile starch starting material by tumbling and pressure sieving in the manner described in Example 1, until a product was obtained containing 0.31% corn oil. The flow rate of this product as determined on the Day dusting machine, using both the Molder and Divider screens, was somewhat lower than the flow rate of the product obtained in Example 1.

EXAMPLE 3

One hundred fifty grams of mobile starch made by coating corn starch with 0.5% tricalcium phosphate, was mixed with 30 grams of corn oil in a laboratory ball mill for 30 minutes, using 2,500 grams of medium sized porcelain balls. An additional 600 grams of the mobile starch starting material was added to the contents of the mill and the mixture was mixed further for another 30 minutes. The mixture was passed through a coarse sieve to separate the porcelain balls, after which increments of the mobile starch starting material were added and the mixture was blended in a Ribbon mixer of 100 pounds capacity for 100 minutes after each increment until the oil level in the products was 0.32%. Three increments were added, the first amounting to 4,500 grams and the last two each amounting to 2,000 grams. The flow rate of this product through the Divider screen of the Day dusting machine was somewhat higher than the flow rate of the product obtained in Example 1.

EXAMPLE 4

A pony was prepared by mixing 120 grams of mobile starch made by coating corn starch with 0.5% tricalcium phosphate, and 500 ml. of corn oil in a Waring blender and was then filtered to give a product containing 25.38% oil on an "as is" basis. An additional 700 grams of the mobile starch starting material was mixed with 100 grams of the pony in a ball mill for 30 minutes, using 2,500 grams of medium sized porcelain balls. After separation of the balls with a coarse sieve, this pre-mix with six increments of the mobile starch starting material in a Ribbon mixer operating for 10 minutes after each addition. The resulting product contained 0.25% corn oil and exhibited a flow rate through the Divider screen of the Day dusting machine which was somewhat lower than the flow rate of the product obtained in Example 3.

EXAMPLE 5

Six pounds of mobile starch made by coating corn starch with 0.5% tricalcium phosphate, was added slowly to 2 pounds of corn oil in a Read vertical mixer having a whisk attachment while the mixer was run at slow speed. The mixer was then run at high speed for 30 minutes. The resulting mixture was passed through an 8 mesh sieve to break up the large particles. Twenty grams of the resulting pony was mixed by tumbling in a container with 3.300 grams of the mobile starch starting material and the resulting mixture containing 0.15% corn oil was passed through a comminuting machine known as a Mikropulverizer, using a screen with round holes 0.027 inch in diameter, at a speed of 16,000 r.p.m. The flow rate of this product through the Divider screen of a Day dusting machine was a great deal lower than the flow rate of common powdered corn starch through the same screen.

EXAMPLE 6

A sample of corn starch, powdered so that 98+% of the particles passed through a 200 mesh screen, was coated with 0.15% of corn oil by a procedure essentially the same as that described in Example 5. Mobile starch, made by coating another sample of the same batch of corn starch with 0.5% tricalcium phosphate, was coated with .15% of corn oil in esesntially the same manner described in Example 5. The flow rates of these products in grams through the Divider screen of the Day Duster compared to the starting materials, are given in the following table, the duration of the run being given in minutes in parentheses:

|  | Not Oil Coated | Oil Coated |
| --- | --- | --- |
| Corn Starch: |  |  |
| Test 1 | 1,350 (5) | 18 (10) |
| Test 2 | 1,302 (5) | 19 (10) |
| Corn Starch coated with Tricalcium Phosphate: |  |  |
| Test 1 | 1,012 (1) | 164 (10) |
| Test 2 |  | 134 (10) |

Example 7

Two thousand two hundred and seventy grams of corn starch powdered so that 98+% of the particles passed through a 200 mesh sieve, 17 grams of tricalcium phosphate and 10 grams of corn oil were slurried in a 5 liter resin kettle with 2.5 liters of methylene chloride, the mixture being agitated for two hours. The methylene chloride was removed from this product by distillation on a hot water bath, followed by evaporation while it was spread out at room temperature. When no solvent odor could be detected, the material was ground in a laboratory Burr mill at its finest setting. The resulting product contained 0.34% oil and had a flow rate through the Divider screen of the Day dusting machine which was much lower than the flow rates of the products obtained in Examples 1 to 5.

EXAMPLE 8

Corn starch was coated with 0.5% of tricalcium phosphate and certain oils, as follows:

|  | Percent |
| --- | --- |
| Seasame oil by the procedure of Example 2 | 0.43 |
| Corn oil and 0.018% seasame oil by the procedure in Example 2 | 0.158 |
| Nujoil by the procedure of Example 4 | 0.20 |
| Hydrogenated soft corn oil, having a melting point of 98.8° F. and an iodine value of 86.0, by the procedure of Example 4 | 0.20 |
| Lightly hydrogenated corn oil by the procedure of Example 4. All but a small portion of this oil was liquid at room temperature and it had an iodine value of 99.2 | 0.22 |

All of these products had a satisfactory flow rate much below that of powdered corn starch when tested with the Molder and Divider screens of the Day dusting machine.

EXAMPLE 9

Twenty Baumé corn starch slurry, containing 35.5% starch dry substance, having a pH of 5.29 was heated to 100° F. and 0.2% calcium lactate based on the starch dry substance was added. The pH was then adjusted to 7.15 by the addition of 10% NaOH solution. The slurry was agitated for one hour after which time the pH had dropped to 7.06. The slurry was dewatered on a Buchner funnel and the resulting cake was crumbled and dried for about four hours under infrared lamps to reduce the moisture content to about 10%. The dried starch was ground through a laboratory hammer mill equipped with a screen having 0.039 inch openings. The ground product had a Kerr Mobility of 94.9% and 94.5% of it passed through a No. 200 U.S. standard sieve.

A sample of the starch product so obtained was then coated with corn oil at a level of 0.15% by the procedure described in Example 5. The resulting product exhibited a flow rate through the Divider screen of the Day dusting machine which was much lower than the flow rate of common powdered corn starch.

EXAMPLE 10

The procedure of Example 9 was repeated except that 0.2% of calcium citrate was substituted for the calcium lactate. The pH of the original slurry was 3.70, the pH after adjustment with NaOH was 7.00 and after one hour it was 7.00. The dried ground corn starch, which had been treated with calcium citrate, had a Kerr Mobility of 96.0%, an average moisture content of 7.8% and 96.0% of it passed through a No. 200 U.S. standard sieve.

The final product containing both calcium citrate and 0.15% corn oil exhibited a flow rate through the Divider screen of the Day dusting machine which was much lower than the flow rate of common powdered corn starch.

EXAMPLE 11

Forty-six thousand and seven pounds of starch dry substance at 18° Baumé was heated with agitation to 120° F.; 0.24% refined corn oil, stabilized with 0.01% butylated hydroxyanisole and 0.01% butylated hydroxytoluene based on the starch dry substance, was added to the slurry and the mixture was agitated for 15 minutes; 0.66% tricalcium phosphate was added and the slurry agitated for one hour at 120° F. The slurry was then diluted to 15.5° Baumé, filtered and dried in a current of air heated to 220° F. to an average moisture content of 8.9%. The dried product was ground so that 98% would pass a No. 200 U.S. standard sieve. Its flow rate in the Day Duster was 1,185 grams in 10 minutes. This product was placed in a Ribbon blender of 60,000 lbs. capacity and blended for 2 hours after all the material was in. The resulting product exhibited a flow rate in the Day Duster of approximately 500 grams in 10 minutes.

EXAMPLE 12

A water slurry of corn starch was prepared containing 92,950 pounds of dry substance starch and having a Baumé of 16.3° at 60° F. (28.96% dry substance). One half of this slurry was filtered and the filter cake was dried and powdered so that more than 98% of the particles would pass a 200 mesh screen.

111 pounds of olive oil (0.24% based on the starch) and 307 pounds of tricalcium phosphate (0.66% based on the starch) were added to the remaining half of the corn starch slurry. The mixture was blended by agitation for one hour at 120° F. and then filtered. The filter cake was dried and powdered in the same manner as the untreated portion of the starch. This product was considered satisfactory as a dusting starch for use in the Day Duster.

Samples of the two products analyzed as follows:

|  | Untreated (Common) Starch | Treated Dusting Starch |
|---|---|---|
| Moisture, percent | 12.1 | 8.2 |
| Oil Extracted with $CCl_4$, percent | 0.05 | 0.23 |
| Calcium Calculated as Tricalcium Phosphate, percent | 0.04 | 0.56 |
| Day Duster Flow Rate (g./10 min.) | 2,156 | 898 |
| Kerr Mobility, percent | 28.25 | 2.87 |

Mobility ratio of treated starch, 2.87/28.25=0.102.

EXAMPLE 13

A pony was prepared by mixing 150 grams of corn starch and 50 grams of silicone oil in a Mix Master blender and then filtered through an 8 mesh U.S. standard screen. 181.6 grams of the pony, 113.5 grams of tricalcium phosphate and 50 lbs. of corn starch were mixed for one hour in a Ribbon mixer and the mixture was passed through a comminuting machine known as a Mikropulverizer, using a screen with round holes 0.027 inch in diameter.

The product contained 0.20% silicon oil and 0.49% tricalcium phosphate based on the weight of the starch. The flow rate of this product through the Divider screen of a Day dusting machine was a great deal lower than the flow rate of common powdered corn starch through the same screen.

By varying the amount of oil or fat or equivalent agent relative to the amount of tricalcium phosphate or equivalent mobility modifying agent within the limits set out above, it is possible to prepare, by the procedures described in the foregoing examples, free-flowing products having a Kerr Mobility ratio in the range from about 0.02 to less than 1.0, which are free flowing, have less tendency to bridge than does common powdered starch and are suitable for use in the Day Duster for dusting dough pieces.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A free-flowing, powdered starch product consisting essentially of starch granules coated with a small amount of a powdered substance capable of increasing the mobility of powdered starch and with a small amount of a substance effective to decrease the mobility of the starch to a Kerr Mobility ration in the range of from 0.02 to less than 1.0.

2. A product as defined in claim 1 wherein the second substance is selected from the group consisting of oils and fate and mixtures thereof.

3. A product as defined in claim 2 wherein the second substance is glyceridic.

4. A product as defined in claim 3 wherein the amount of the powdered substance is within the range from about 0.1% to 1.0% based on the dry substance weight of the starch and the amount of oil and fat extractable from the starch product with $CCl_4$ is within the range from about 0.15 to 1.0% based on the dry substance weight of the starch.

5. A product as defined in claim 4 wherein the powdered substance is tricalcium phosphate and the second substance is a vegetale oil.

6. A product as defined in claim 5 wherein the amount of powdered tricalcium phosphate is within the range from about 0.4% to 0.8% based on the dry substance weight of the starch and the amount of vegetable oil is such that the amount of fatty material extractable from the starch product with $CCl_4$ is within the range from about 0.15% to 0.30% based on the dry substance weight of the starch.

7. A product as defined in claim 6 wherein the vegetable oil is olive oil.

8. A method of dusting articles which comprises causing starch product as defined in claim 1 to flow through a screen onto the articles.

9. A method of dusting dough pieces which comprises causing a starch product as defined in claim 2 to flow through a screen onto the dough pieces.

References Cited

UNITED STATES PATENTS

| | | | |
|---|---|---|---|
| 2,012,506 | 8/1935 | Griffith | 99—92 |
| 2,144,371 | 1/1939 | Griffith | 99—92 |
| 2,554,143 | 5/1951 | Hinz et al. | 99—139 |
| 2,614,945 | 10/1952 | Krisan | 117—100 |

RAYMOND N. JONES, *Primary Examiner.*